United States Patent
Yu et al.

(10) Patent No.: US 9,097,936 B2
(45) Date of Patent: Aug. 4, 2015

(54) BACKLIGHT UNIT FOR LIQUID CRYSTAL DISPLAY DEVICE

(71) Applicant: LG Display Co., Ltd., Seoul (KR)

(72) Inventors: Jae-Hui Yu, Iksan-si (KR); Sang-Soo Lee, Goyang-si (KR); Seong-Hae Ha, Busan (KR)

(73) Assignee: LG Display Co., Ltd., Seoul (KR)

( * ) Notice: Subject to any disclaimer, the term of this patent is extended or adjusted under 35 U.S.C. 154(b) by 69 days.

(21) Appl. No.: 14/140,225

(22) Filed: Dec. 24, 2013

(65) Prior Publication Data

US 2014/0176864 A1 Jun. 26, 2014

(30) Foreign Application Priority Data

Dec. 26, 2012 (KR) .................. 10-2012-0153128

(51) Int. Cl.
*G02F 1/1335* (2006.01)
*F21V 8/00* (2006.01)

(52) U.S. Cl.
CPC ........ *G02F 1/133608* (2013.01); *G02B 6/0088* (2013.01)

(58) Field of Classification Search
CPC ............... G02F 1/133615; G02F 1/133603; G02F 1/133604; G02F 1/133608; G02F 2001/133607; G02B 6/0038; G02B 6/0053; G02B 6/0068
USPC ................................ 349/61, 62, 65
See application file for complete search history.

(56) References Cited

U.S. PATENT DOCUMENTS

2009/0103282 A1* 4/2009 Itaya ........................... 362/97.1

* cited by examiner

*Primary Examiner* — Mike Qi
(74) *Attorney, Agent, or Firm* — Fenwick & West LLP (57) ABSTRACT

A backlight unit for a liquid crystal display device includes a cover bottom including a horizontal plane and sides perpendicular to the horizontal plane; guides disposed at inner surfaces of the sides of the cover bottom and each including first, second and third portions, wherein the second portion protrudes from the first portion, and the third portion protrudes from the second portion and has elasticity; a reflection sheet disposed on the first portions; a light guide plate disposed over the reflection sheet and on the second portions; an LED assembly disposed at a first side of the light guide plate; and optical sheets disposed over the light guide plate.

8 Claims, 6 Drawing Sheets

FIG. 1

Related Art

BACKLIGHT UNIT FOR LIQUID CRYSTAL DISPLAY DEVICE

CROSS-REFERENCE TO RELATED APPLICATIONS

The present application claims the priority benefit of Korean Patent Application No. 10-2012-0153128 filed in the Republic of Korea on Dec. 26, 2012, which is hereby incorporated by reference in its entirety.

BACKGROUND

1. Field of the Disclosure

The present disclosure relates to a backlight unit for a liquid crystal display device, and more particularly, to a backlight unit for a liquid crystal display device that prevents a light guide plate from moving and blocks light leakage.

2. Discussion of the Related Art

Liquid crystal display (LCD) devices are widely used as monitors of notebook computers, monitors of personal computers and televisions due to excellent reproduction of moving images and a high contrast ratio. LCD devices use the optical anisotropy and polarization properties of liquid crystal molecules of a liquid crystal layer to produce an image.

An LCD device includes two substrates spaced apart from each other and facing each other as well as a liquid crystal layer interposed between the two substrates. The alignment direction of the liquid crystal molecules is controlled by varying the intensity of an electric field applied to the liquid crystal layer, thus changing the transmittance of light through the liquid crystal layer.

The LCD devices require an additional light source because the LCD devices are not self-luminescent. Therefore, a backlight unit is disposed at a rear side of a liquid crystal (LC) panel and emits light into the LC panel to display images.

Backlight units include cold cathode fluorescent lamps (CCFLs), external electrode fluorescent lamps (EEFLs), and light emitting diodes (LEDs) as a light source. Among these, LEDs have been widely used due to their small sizes, low power consumption, and high reliability.

Backlight units are in general classified as edge type or direct type according to the position of the light source with respect to an LC panel. In edge-type backlight units, a light guide plate is disposed under the LC panel, and one or a pair of lamps are disposed at one side or at each of two sides of the light guide plate. In direct-type backlight units, a plurality of lamps is disposed directly under the LC panel, and light from the lamps is directly provided to the LC panel.

The direct-type backlight units are widely used for LCD devices considering brightness as important because of the resulting limitation on the decrease in thickness of the device that is possible, while the edge-type backlight units are widely used for LCD devices considering a thickness as important such as monitors of notebooks or personal computers.

Figure 1:
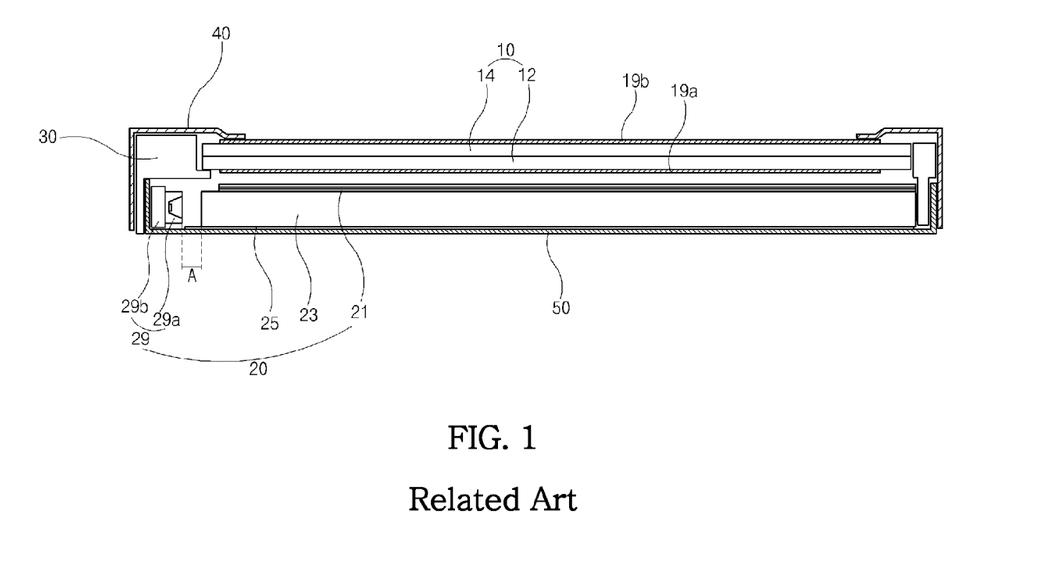
FIG. 1 is a cross-sectional view illustrating an LCD device including an edge-type backlight unit having LEDs as a light source according to the related art.

FIG. 1 is a cross-sectional view of illustrating a liquid crystal display (LCD) device including an edge-type backlight unit having LEDs as a light source according to the related art.

In FIG. 1, the related art LCD device includes a liquid crystal panel 10, an edge-type backlight unit 20, a guide panel 30, a top cover 40 and a cover bottom 50.

The liquid crystal panel 10 displays images and includes first and second substrates 12 and 14 facing and attached to each other with a liquid crystal layer (not shown) interposed therebetween. Polarizers 19a and 19b are attached at rear and front surfaces of the liquid crystal panel 10 and control the polarization of light.

The backlight unit 20 is disposed at a rear side of the liquid crystal panel 10. The backlight unit 20 includes an LED assembly 29, a reflection sheet 25, a light guide plate 23 and a plurality of optical sheets 21. The LED assembly 29 is disposed at an edge of at least one side of the guide panel 30 along a length direction. The LED assembly 29 includes a plurality of LEDs 29a emitting light and a printed circuit board (PCB) 29b on which the LEDs 29a are mounted. The reflection sheet 25 is disposed over the cover bottom 50 and is white-colored or silver-colored. The light guide plate 23 is disposed over the reflection sheet 25. The plurality of optical sheets 21 are disposed over the light guide plate 23.

Edges of the liquid crystal panel 10 and the backlight unit 20 are surrounded by the guide panel 30 having a rectangular frame shape. The top cover 40 covers edges of the front surface of the liquid crystal panel 10, and the cover bottom 50 covers a rear surface of the backlight unit 20. The top cover 40 and the cover bottom 50 are combined with the guide panel 30 to form one united body.

Various optical designs are considered to provide a surface light source from the backlight unit 20 of the LCD device to the liquid crystal panel 10. Among these, maintaining an optical gap A between the light guide plate 23 and the LED assembly 29 is a significant factor.

To do this, a guide groove (not shown) is formed at an edge of the light guide plate 23, and a stopper (not shown) corresponding to the guide groove is formed at the guide panel 30. The optical gap A is maintained by inserting the stopper into the guide groove and preventing the light guide plate 23 from being moved.

However, it is not easy to form the stopper because the guide panel 30 needs to have a thin thickness in realizing an LCD device having a thin profile, light weight and narrow bezel, which have been recently required. In addition, since the guide groove (not shown) at the edge of the light guide plate 23 is close to the active area for displaying an image, light is diffused or scattered by the guide groove (not shown) of the light guide plate 23 when the light emitted from the LEDs 29a progresses in the light guide plate 23 and is refracted and reflected toward the liquid crystal panel 10 to provide a surface light source.

That is, light leakage occurs due to the guide groove of the light guide plate 23, and an area where the guide groove is formed is shown relatively bright as compared with other areas. Thus, problems of lowering qualities of the LCD device such as decreases in brightness and image qualities are caused.

SUMMARY OF THE INVENTION

Accordingly, the present invention is directed to a backlight unit for a liquid crystal display device, which substantially obviates one or more of the problems due to limitations and disadvantages of the related art.

An object of the present disclosure is to provide a backlight unit for a liquid crystal display device that prevents movement of a light guide plate to block light leakage.

Another object of the present disclosure is to provide a liquid crystal display device including a backlight unit that is able to improve brightness and image qualities of the liquid crystal display device.

Another object of the present disclosure is to provide a liquid crystal display device that has light weight, slim thickness and narrow bezel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a backlight unit for a liquid crystal display device that includes a cover bottom including a horizontal plane and sides perpendicular to the horizontal plane; guides disposed at inner surfaces of the sides of the cover bottom and each including first, second and third portions, wherein the second portion protrudes from the first portion, and the third portion protrudes from the second portion and has elasticity; a reflection sheet disposed on the first portions; a light guide plate disposed over the reflection sheet and on the second portions; an LED assembly disposed at a first side of the light guide plate; and optical sheets disposed over the light guide plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment, an example of which is illustrated in the accompanying drawings.

Figure 2:
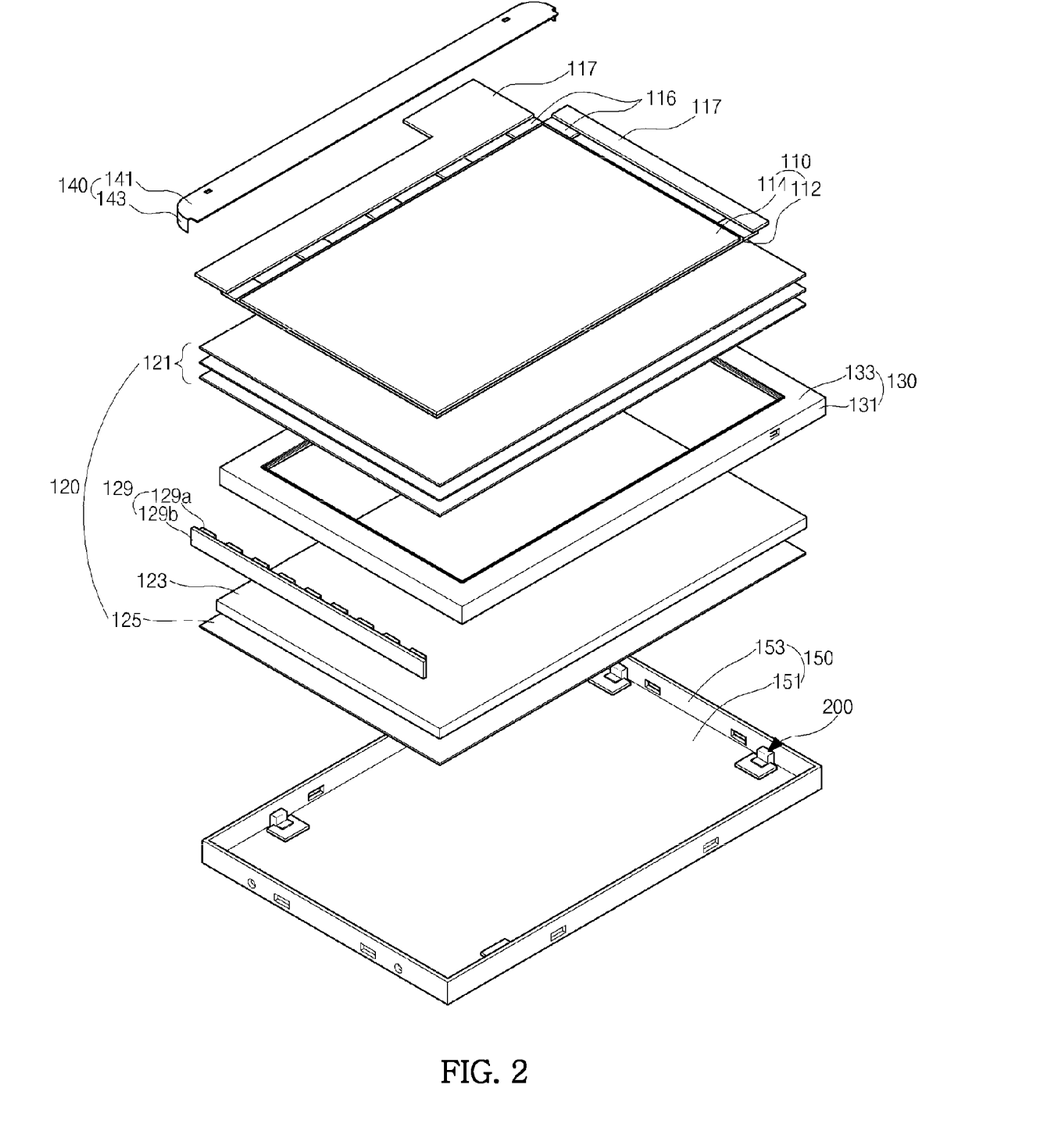
FIG. 2 is an exploded perspective view schematically illustrating an LCD device according to an exemplary embodiment of the present invention.

FIG. 2 is an exploded perspective view schematically illustrating an LCD device according to an exemplary embodiment of the present invention.

In FIG. 2, an LCD device of the present invention includes a liquid crystal panel 110 and a backlight unit 120 that lie one upon another and further includes a guide panel 130, a case top 140 and a cover bottom 150 to unite the liquid crystal panel 110 and the backlight unit 120 as one body.

Here, when a display surface of the liquid crystal panel 110 faces the front, the backlight unit 120 is disposed at the rear of the liquid crystal panel 110, the guide panel 130 having a rectangular frame shape surrounds the side surfaces of the liquid crystal panel 110 and the backlight unit 120, the case top 140 covers an edge of a front surface of the liquid crystal panel 110, and the cover bottom 150 closely disposed at the rear surface of the backlight unit 120 is combined with the case top 140 to thereby form one united body.

More particularly, the liquid crystal panel 110 displays images. The liquid crystal panel 110 includes first and second substrates 112 and 114 facing and attached to each other with a liquid crystal layer (not shown) interposed there between. In an active matrix-type liquid crystal panel 110, although not shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

A black matrix and red, green and blue color filter patterns are formed on an inner surface of the second substrate 114, which may be referred to as an upper substrate or a color filter substrate. The color filter patterns correspond to the pixel regions. The black matrix surrounds each of the color filter patterns and covers the gate lines, the data lines, and the thin film transistors. A transparent common electrode is formed over the color filter patterns and the black matrix. The common electrode may be formed with the pixel electrode over the first substrate 112.

Polarizers (not shown) are attached to outer surfaces of the first and second substrates 112 and 114 and selectively transmit linearly polarized light.

A printed circuit board 117 is attached to at least a side of the liquid crystal panel 110 via connecting means 116 such as flexible printed circuit boards or tape carrier packages (TCPs). The printed circuit board 117 is bent toward a side surface of the guide panel 130 or a rear surface of the cover bottom 150 during a module assembly process.

In the liquid crystal panel 110, on/off signals from gate driving circuits are provided to the thin film transistors through the gate lines, and when the thin film transistors selected by each gate line turn on, data signals from data driving circuits are provided to the pixel electrodes through the data lines. According to this signal voltage, an electric field is induced between the pixel electrodes and the common electrode, and the arrangement of the liquid crystal molecules is changed by the electric field to thereby change transmittance of light. Therefore, the liquid crystal panel 110 displays variances in the transmittance as images.

The backlight unit 120 is disposed under the liquid crystal panel 110 and provides light to the liquid crystal panel 110 so that the variances in the transmittance of the liquid crystal panel 110 are shown to the outside.

The backlight unit 120 includes a light-emitting diode (LED) assembly 129, a reflection sheet 125 of a white or silver color, a light guide plate 123 over the reflection sheet 125, and optical sheets 121 over the light guide plate 123.

The LED assembly 129, as a light source of the backlight unit 120, is disposed at a side of the light guide plate 123 such that the LED assembly 129 faces a side surface of the light guide plate 123, which light is incident on and is referred to as a light-incident surface hereinafter. The LED assembly 129 includes a plurality of LEDs 129a and a printed circuit board (PCB) 129b on which the LEDs 129a are mounted to be spaced apart from each other.

The LEDs 129a include red (R), green (G) and blue (B) LEDs respectively emitting red, green and blue light toward the light-incident surface of the light guide plate 123. White light is produced by lighting the RGB LEDs 129*a* up at the same time and thus mixing the red, green and blue light.

Alternatively, the LEDs 129*a* may emit white light. For example, the LEDs 129*a* may include a blue LED chip and use cerium-doped yttrium aluminum garnet (YAG:Ce) as a fluorescent substance. That is, the LEDs 129*a* may be a blue LED with a yellow fluorescent substance. When passing through the fluorescent substance, blue light emitted from the blue LED chip of the LEDs 129*a* is mixed with yellow light from the fluorescent substance, thereby producing white light.

The light guide plate 123 totally reflects light emitted from the LEDs 129*a* several times such that the light moves through the inside of the light guide plate 123 and is uniformly scattered. Accordingly, an initial surface light source is provided to the liquid crystal panel 110.

The light guide plate 123 has high transparency, weatherability, and colorability, and the light guide plate 123 induces light to diffuse when the light passes through it.

To provide a uniform surface light source, the light guide plate 123 may include predetermined patterns at its rear surface. Here, to guide the light incident on the inside of the light guide plate 123, the patterns may be elliptical patterns, polygonal patterns or hologram patterns. The patterns may be formed by a printing method or an injecting method.

The reflection sheet 125 is disposed under the rear surface of the light guide plate 123. The reflection sheet 125 reflects light passing through the rear surface of the light guide plate 123 toward the liquid crystal panel 110 to increase the brightness.

The optical sheets 121 over the light guide plate 123 include a diffuser sheet and at least a light-concentrating sheet. The optical sheets 121 diffuse or concentrate light passing through the light guide plate 123 such that a more uniform surface light source is provided to the liquid crystal panel 110.

The optical sheets 121 may include a reflective polarizing sheet reusing linearly polarized light to increase light efficiency.

The liquid crystal panel 110 and the backlight unit 120 are modularized with the guide panel 130, the case top 140 and the cover bottom 150. The cover bottom 150 has a horizontal plane 151 over which the liquid crystal panel 110 and the backlight unit 120 are disposed, and the cover bottom 150, which functions as a lower frame, supports the whole LCD device and minimizes loss of light. The four edges of the horizontal plane 151 of the cover bottom 150 are bent perpendicularly toward the liquid crystal panel 110 and become sides 153.

The guide panel 130 has a rectangular frame shape. The guide panel 130 is disposed over the cover bottom 150 and surrounds edges of the liquid crystal panel 110 and the backlight unit 120. The guide panel 130 is combined with the cover bottom 150.

Here, the guide panel 130 includes side walls 131 and horizontal portions 133. The side walls 131 surround side surfaces of the backlight unit 120. The horizontal portions 133 separate positions of the liquid crystal panel 110 and the backlight unit 120 at the inner surfaces of the side walls 131. The liquid crystal panel 110 is attached and fixed onto the horizontal portions 133 by an adhesive pad (not shown) such as a double-sided tape.

Therefore, the liquid crystal panel 110 and the backlight unit 120 are modularized to form one united body.

Light guide plate (LGP) guides 200 having elasticity are formed at inner surfaces of the sides 153 of the cover bottom 150 to prevent movement of the light guide plate 123 and to fix the light guide plate 123.

Accordingly, the light guide plate 123 of the LCD device is prevented from being moved in a horizontal or vertical direction due to impacts or shaking from the outside.

From this, the LEDs 129*a* are prevented from being damaged by movement of the light guide plate 123, thereby solving problems where optical properties of the LCD device are changed and image qualities of the LCD device are lowered.

In addition, since the guide groove (not shown) is not necessary, light leakage due to light scattered by the guide groove is prevented. Therefore, the brightness and image qualities of the LCD device are improved. This will be described in more detail later.

The case top 140 is disposed at the front of the liquid crystal panel 110 modularized by the cover bottom 150 and the guide panel 130, and the case top 140 protects and covers driving circuits at an edge of the liquid crystal panel 110.

The case top 140 corresponds to one side 153 of the cover bottom 150 and is of a blade type having a rectangular frame shape with an L-shaped cross-section to cover the edge of the front surface of the liquid crystal panel 110 and an outer surface of the side 153 of the cover bottom 150.

The LCD device according to the present invention is light weight, has slim thickness and also has a narrow bezel because the case top 140 is formed in correspondence with one edge of the liquid crystal panel 110, and manufacturing processes are simplified.

The case top 140 may be referred to as a top cover or a top case. The guide panel 130 may be referred to as a support main, a main support or a mold frame. The cover bottom 150 may be referred to as a bottom cover or a lower cover.

Here, the above-mentioned backlight unit 120 may be referred to as a side light type, and the LEDs 129*a* may be arranged in two or more lines on the printed circuit board 129*b*.

In the LCD device of the present invention, although the impacts or shaking from the outside occur, the light guide plate 123 is prevented from being moved. The LEDs 129*a* of the LED assembly 129 are prevented from being damaged due to the movement of the light guide plate 123, and image qualities of the LCD device are prevented from being lowered due to changes in the optical properties of the LCD device.

Moreover, since the guide groove (not shown) is not necessary, light leakage due to light scattered by the guide groove is prevented. Therefore, the brightness and image qualities of the LCD device are improved.

Figure 3A:
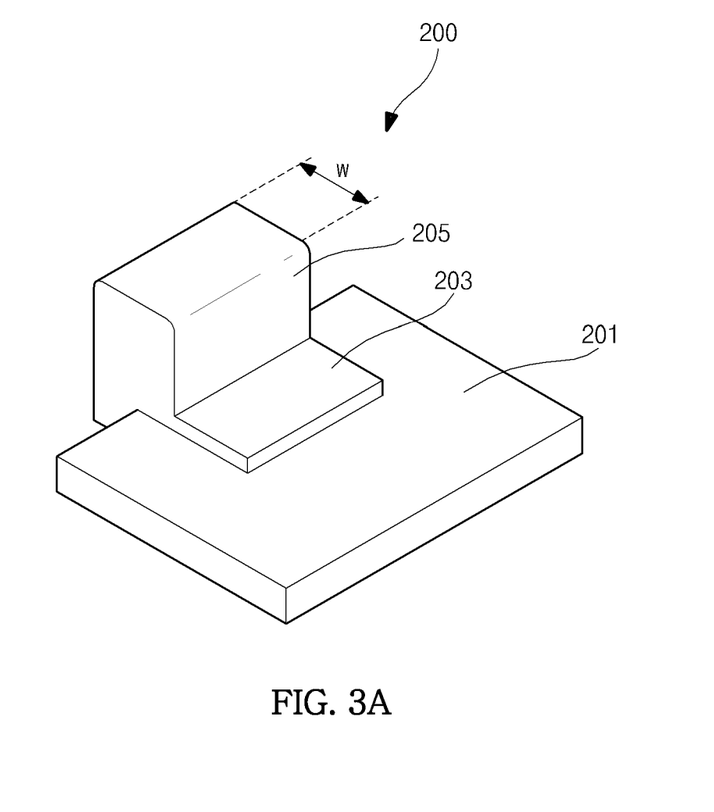
FIG. 3A and FIG. 3B are perspective views schematically illustrating an LGP guide according to an exemplary embodiment of the present invention.
Figure 3B:
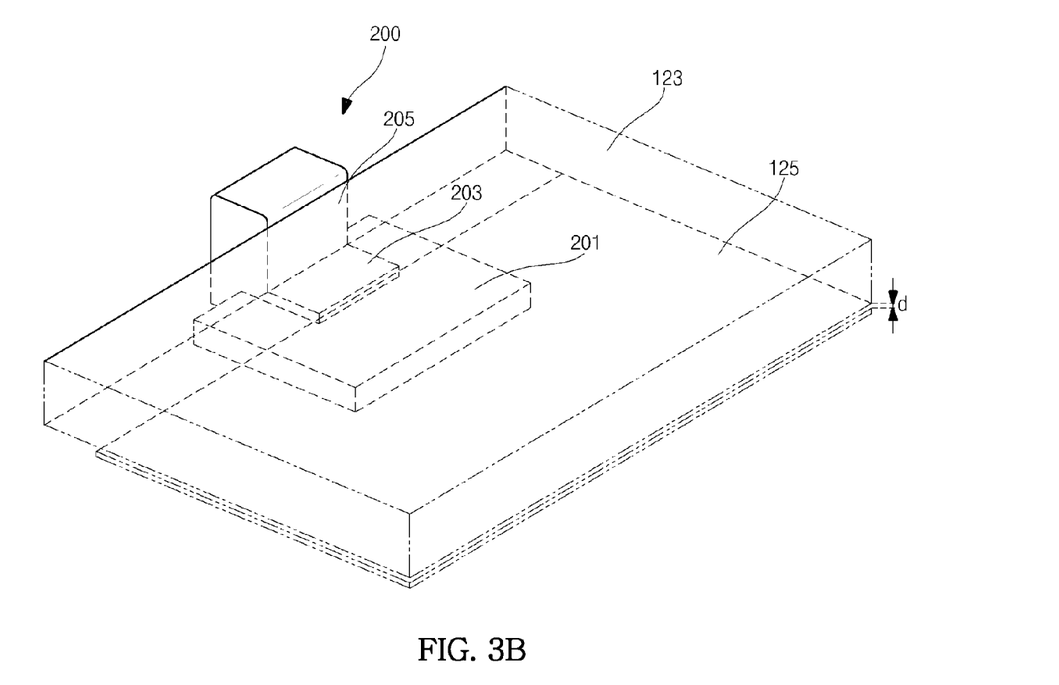

FIG. 3A and FIG. 3B are perspective views schematically illustrating an LGP guide according to an exemplary embodiment of the present invention.

In FIG. 3A and FIG. 3B, the LGP guide 200 includes a first portion 201, a second portion 203 and a third portion 205. The first portion 201 supports the reflection sheet 125. The second portion 203 protrudes with a predetermined height from the first portion 201 and supports the light guide plate 123. The third portion 205 protrudes with a predetermined height from the second portion 203. The height of the third portion 203 is larger than the height of the second portion 201. The second portion 203 may have a smaller size than the first portion 201, and the third portion 205 may have a smaller size than the second portion 203.

Accordingly, edges of the reflection sheet 125 are disposed over and supported by the first portion 201, which is exposed by the second portion 203, and edges of the light guide plate 123 are disposed over and supported by the second portion 203 exposed by the third portion 205.

The light guide plate 123 is guided such that the edges of the light guide plate 123 partially contact the third portion 205.

The LGP guide 200 may be formed of a natural or artificial material having relatively high elasticity such as silicone, gelatin, latex, synthetic rubber, and elastic polyurethane, for example.

Therefore, the LGP guide 200 of the present invention prevents the light guide plate 123 from being moved and uniformly maintains the optical gap A of FIG. 1 between the light guide plate 123 and the LED assembly 129 of FIG. 2 to provide a high quality surface light source to the liquid crystal panel 110 of FIG. 2.

Accordingly, it is prevented that the LEDs 129a of FIG. 2 of the LED assembly 129 of FIG. 2 are damaged by the movement of the light guide plate 123 or the image qualities are lowered due to the change in the optical properties of the LCD device.

In addition, although the light guide plate 123 is moved by the impacts from the outside applied to the modularized LCD device, the light guide plate 123 goes back to its original position due to the elasticity of the LGP guide 200 at once, and the optical gap A of FIG. 1 between the LED assembly 129 of FIG. 2 and the light guide plate 123 is uniformly maintained.

Moreover, when the impacts from the outside are applied to the modularized LCD device, vibrations and impacts are absorbed because of the elasticity of the LGP guide 200, and the light guide plate 123 is prevented from being damaged.

Furthermore, since deformation due to thermal expansion of the light guide plate 123 is also absorbed, the distance between the light guide plate 123 and the guide panel 130 is uniformly maintained.

Additionally, the LGP guide 200 does not need the guide groove (not shown) at the edge of the light guide plate 123 to guide the light guide plate 123, and thus light leakage due to light scattered by the guide groove is prevented. Therefore, the brightness and image qualities of the LCD device are improved.

The area of the first portion 201 exposed by the second portion 203 and the area of the second portion 203 exposed by the third portion 205 may not be limited, and beneficially, the third portion 205, which contacts and supports the edge of the light guide plate 123, may have a predetermined width w such that the deformation due to the thermal expansion of the light guide plate 123 is absorbed.

The reflection sheet 125 is disposed on the first portion 201 of the LGP guide 200 and the light guide plate 123 is disposed on the second portion 203 of the LGP guide 200. Thus, the reflection sheet 125 and the light guide plate 123 are disposed with a predetermined distance d therebetween, which corresponds to a protruding height of the second portion 203 from the first portion 201.

Since the reflection sheet 125 and the light guide plate 123 have the predetermined distance d therebetween, a wet-out phenomenon due to contact of the reflection sheet 125 and the light guide plate 123 is prevented.

Here, the wet-out phenomenon is a phenomenon that two surfaces optically contact each other and a contact portion is seen in an image, and the contact portion tends to be seen more when moisture permeates the module under high temperatures and high humidity.

More particularly, the reflection sheet 125, which has a relatively thinner thickness than the light guide plate 123, may crumple due to the heat generated when the liquid crystal panel 110 of FIG. 2 or the LED assembly 129 of FIG. 2 of the backlight unit 120 of FIG. 2 is driven, thereby causing wrinkles When the reflection sheet 125 with the wrinkles contacts the light guide plate 123, there is a difference in brightness between an area including the wrinkles and an area excluding the wrinkles of a display area of the LCD device. Thus, spots are shown in the images due to the difference in brightness.

However, in the present invention, since the reflection sheet 125 and the light guide plate 123 are disposed with the predetermined distance d therebetween and do not contact each other, the spots in the images due to the difference in the brightness are prevented.

Figure 4:
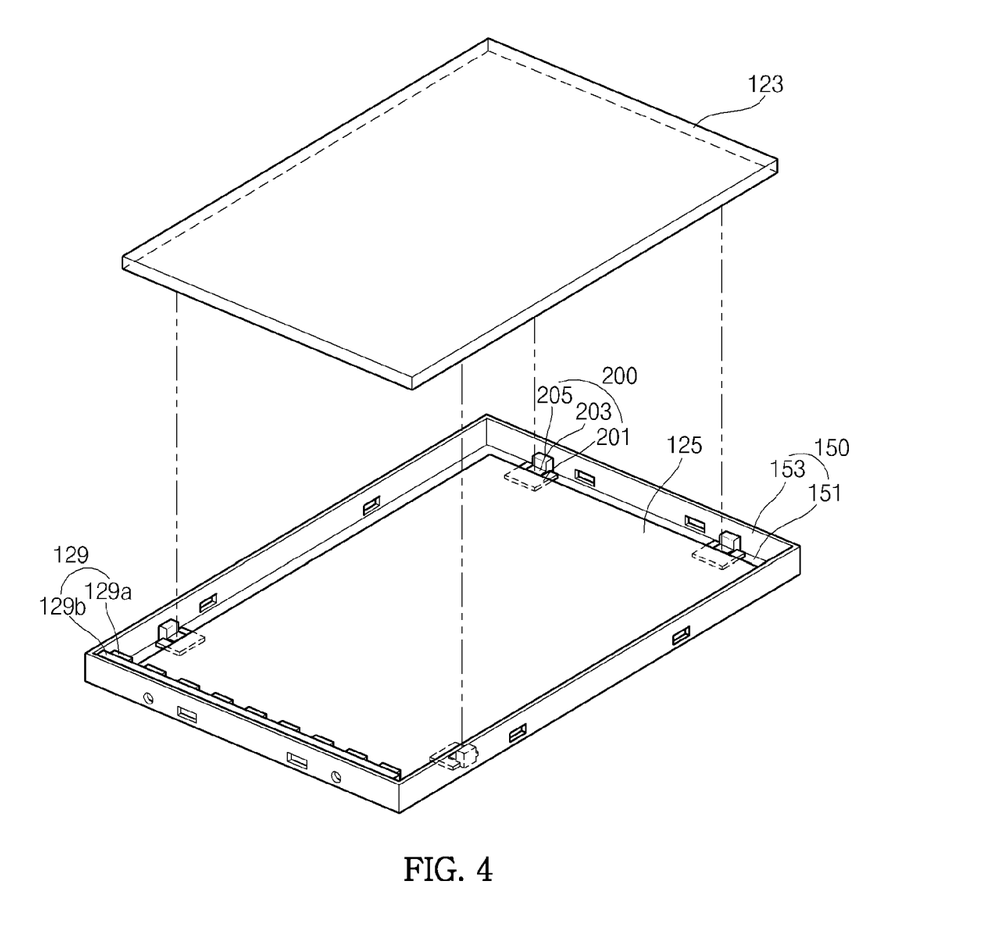
FIG. 4 is a perspective view schematically illustrating a light guide plate and an LGP guide in an assembly process according to an exemplary embodiment of the present invention.

FIG. 4 is a perspective view schematically illustrating a light guide plate and an LGP guide in an assembly process according to an exemplary embodiment of the present invention.

In FIG. 4, the cover bottom 150 has a rectangular plate shape and includes the horizontal plane 151 and the sides 153. The horizontal plane 151 is closely disposed over the rear surface of the backlight unit 120 of FIG. 2. The horizontal plane 151 may contact the rear surface of the backlight unit 120 of FIG. 2. The four edges of the horizontal plane 151 of the cover bottom 150 are bent perpendicularly upward and become the sides 153.

The LED assembly 129 is arranged at an edge of the cover bottom 150 along a first length direction, which is shorter than a second length direction of the cover bottom 150.

The LGP guides 200 are respectively formed at inner surfaces of the sides 153 of both edges perpendicular to the edge of the cover bottom 150 where the LED assembly 129 is arranged such that the first portions 201 and the second portions 203 of the LGP guides 200 face each other. The LGP guides 200 are formed at an inner surface of the side 153 of an edge of the cover bottom 150 opposite to the edge of the cover bottom 150 where the LED assembly 129 is arranged such that the first portions 201 and the second portions 203 of the LGP guides face the edge of the cover bottom 150 where the LED assembly 129 is arranged.

Accordingly, the LGP guides 200 partially support edges of the light guide plate 123 except for an edge corresponding to the light-incident surface of the light guide plate 123.

It is desirable that more than two LGP guides 200 may be formed at the inner surface of the side 153 of the edge of the cover bottom 150 opposite to the edge of the cover bottom 150 where the LED assembly 129 is arranged.

The reflection plate 125 is partially disposed on and supported by the first portions 201 of the LGP guides 200, and the light guide plate 123 is partially disposed on and supported by the second portions 203 of the LGP guides 200. The edges of the light guide plate 123 are disposed close to and contact the third portions 205 of the LGP guides 200 and are fixed over the cover bottom 150.

Since the light guide plate 123 contacts the third portions 205 and is forced by the third portions 205, the light guide plate 123 is prevented from being moved.

From this, the optical gap A of FIG. 1 between the LED assembly 129 and the light guide plate 123 is uniformly maintained.

Therefore, the LEDs 129a are prevented from being damaged by movement of the light guide plate 123, thereby solving problems where optical properties of the LCD device are changed and image qualities of the LCD device are lowered.

In addition, although the light guide plate 123 is moved by the impacts from the outside applied to the modularized LCD device, the light guide plate 123 goes back to its original position due to the elasticity of the LGP guides 200 at once, and the optical gap A of FIG. 1 between the LED assembly 129 of FIG. 2 and the light guide plate 123 is uniformly maintained.

Moreover, vibrations and impacts are absorbed by the elasticity of the LGP guides 200, and the light guide plate 123 is prevented from being damaged. Since deformation due to thermal expansion of the light guide plate 123 is also absorbed, the distance between the light guide plate 123 and the guide panel 130 of FIG. 2 is uniformly maintained.

Additionally, the LGP guides 200 do not need the guide grooves (not shown) at the edges of the light guide plate 123 to guide the light guide plate 123, and thus light leakage due to light scattered by the guide grooves is prevented. Therefore, the brightness and image qualities of the LCD device are improved.

Figure 5:
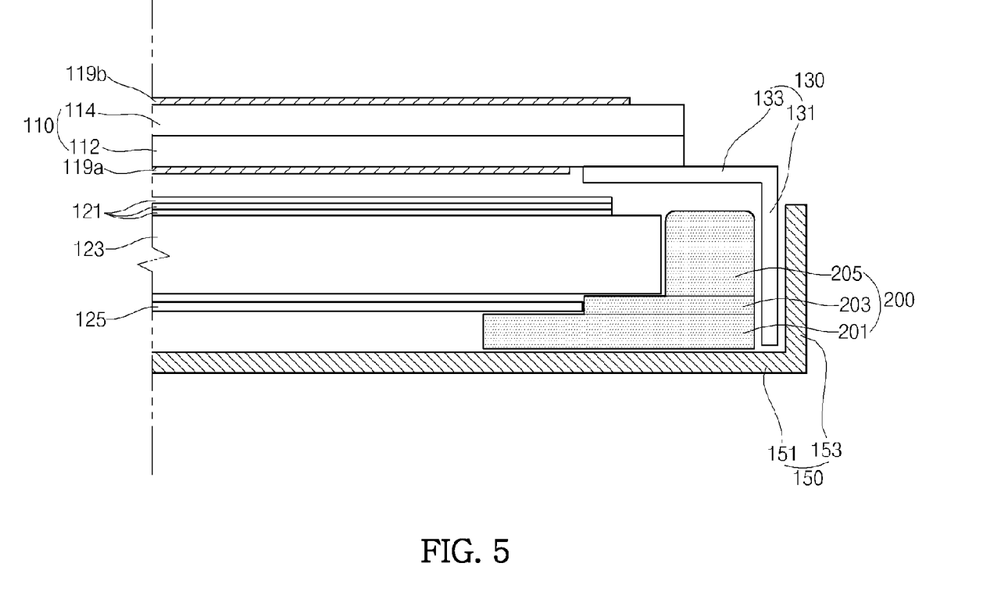
FIG. 5 is a cross-sectional view schematically illustrating a part of the modularized LCD device of FIG. 2.

FIG. 5 is a cross-sectional view schematically illustrating a part of the modularized LCD device of FIG. 2.

In FIG. 5, the reflection sheet 125, the light guide plate 123, the LED assembly 129 of FIG. 4 and the optical sheets 121 constitute the backlight unit 120 of FIG. 2. The LED assembly 129 is disposed at the side of the light guide plate 123, and the optical sheets 121 are sequentially disposed over the light guide plate 123.

The liquid crystal panel 110, which includes the first and second substrates 112 and 114 and the liquid crystal layer (not shown) interposed therebetween, is disposed over the backlight unit 120 of FIG. 2, and the polarizers 119a and 119b are attached to the outer surfaces of the first and second substrates 112 and 114 to selectively transmit linearly polarized light.

The side surfaces of the liquid crystal panel 110 and the backlight unit 120 of FIG. 2 are surrounded by the side walls 131 of the guide panel 130, and the liquid crystal panel 110 is disposed over the horizontal portions 133, which protrude from the inner surfaces of the side walls 131.

The liquid crystal panel 110 and the backlight unit 120 of FIG. 2, which are surrounded by the guide panel 130, are disposed over the horizontal plane 151 in the sides 153 of the cover bottom 150, and outer surfaces of the side walls 131 of the guide panel 130 contact the inner surfaces of the sides 153 of the cover bottom 150.

Here, when the backlight unit 120 of FIG. 2, which is surrounded by the side walls 131 of the guide panel 130, is disposed over the horizontal plane 151 of the cover bottom 150, the LGP guides 200 contact the inner surfaces of the side walls 131 of the guide panel 130, the reflection sheet 125 is disposed on and supported by the first portions 201 of the LGP guides 200, and the light guide plate 123 is disposed on and supported by the second portions 203 of the LGP guides 200.

The edges of the light guide plate 123 contact the third portions 205 of the LGP guides 200.

Accordingly, the light guide plate 123 is prevented from being moved by the LGP guides 200, and the optical gap A of FIG. 1 between the light guide plate 123 and the LED assembly 129 of FIG. 4 is uniformly maintained. The vibrations and impacts from the outside applied to the LCD device are absorbed by the elasticity of the LGP guides 200, and the light guide plate 123 is prevented from being damaged.

From this, damage to the LEDs 129a of FIG. 4 is prevented, and the image qualities are prevented from being decreased due to the change in the optical properties of the LCD device.

Moreover, deformation due to thermal expansion of the light guide plate 123 is absorbed, and the distance between the light guide plate 123 and the guide panel 130 is uniformly maintained.

Furthermore, since the LGP guides 200 do not need the guide grooves (not shown) at the edges of the light guide plate 123 to guide the light guide plate 123, light leakage due to light scattered by the guide grooves is prevented. Therefore, the brightness and image qualities of the LCD device are improved.

Since the reflection sheet 125 is disposed on the first portions 201 of the LGP guides 200, the reflection sheet 125 is spaced apart from the horizontal plane 151 of the cover bottom 150 with a space therebetween. The driving circuits (not shown) may be disposed in the space between the reflection sheet 125 and the horizontal plane 151 of the cover bottom 150.

As mentioned above, the LGP guides 200 of the present invention are formed of an elastic material, and the movement of the light guide plate 123 is prevented. Thus, the optical gap A of FIG. 1 between the LED assembly 129 of FIG. 4 and the light guide plate 123 is uniformly maintained.

Therefore, the light guide plate 123 or the LEDs 129a of FIG. 4 of the LED assembly 129 of FIG. 4 are prevented from being damaged by movement of the light guide plate 123, or the image qualities of the LCD device are prevented from being lowered due to the change in the optical properties of the LCD device.

In addition, deformation due to thermal expansion of the light guide plate 123 is absorbed by the LGP guides 200, and the distance between the light guide plate 123 and the guide panel 130 is uniformly maintained.

Furthermore, since the LGP guides 200 do not need the guide grooves (not shown) at the edges of the light guide plate 123 to guide the light guide plate 123, light leakage due to light scattered by the guide grooves is prevented. Therefore, the brightness and image qualities of the LCD device are improved.

It will be apparent to those skilled in the art that various modifications and variations can be made in a display device of the present disclosure without departing from the spirit or scope of the invention. Thus, it is intended that the present invention covers the modifications and variations of this invention provided they come within the scope of the appended claims and their equivalents.

What is claimed is:

1. A backlight unit for a liquid crystal display device, comprising:
    a cover bottom including a horizontal plane and sides perpendicular to the horizontal plane;
    guides disposed at inner surfaces of the sides of the cover bottom and each including first, second and third portions, wherein the second portion protrudes from the first portion, and the third portion protrudes from the second portion and has elasticity;
    a reflection sheet disposed on the first portions;
    a light guide plate disposed over the reflection sheet and on the second portions;
    an LED assembly disposed at a first side of the light guide plate; and
    optical sheets disposed over the light guide plate.

2. The backlight unit according to claim 1, wherein edges of the light guide plate contact and are supported by the second portions of the guides.

3. The backlight unit according to claim 1, wherein the reflection sheet is partially supported by the first portions exposed by the second portions, and the light guide plate is partially supported by the second portions exposed by the third portions.

4. The backlight unit according to claim 1, wherein the guides include one of silicone, gelatin, latex, synthetic rubber, and elastic polyurethane.

5. The backlight unit according to claim 1, wherein the guides partially support second, third and fourth sides of the light guide plate, and wherein the second side is opposite to the first side, and the third and fourth sides facing each other are perpendicular to the first side.

6. The backlight unit according to claim 5, wherein more than two guides are disposed corresponding to the second side.

7. The backlight unit according to claim 1, wherein the reflection sheet is spaced apart from the horizontal plane with a predetermined distance therebetween.

8. The backlight unit according to claim 7, wherein driving circuits are disposed between the reflection sheet and the horizontal plane.

* * * * *